June 12, 1962  A. H. KENT  3,038,480
SHAVER DESK SET
Filed Sept. 28, 1959  2 Sheets-Sheet 1

INVENTOR.
ALLEN H. KENT
BY
ATTORNEYS

June 12, 1962  A. H. KENT  3,038,480
SHAVER DESK SET
Filed Sept. 28, 1959  2 Sheets-Sheet 2
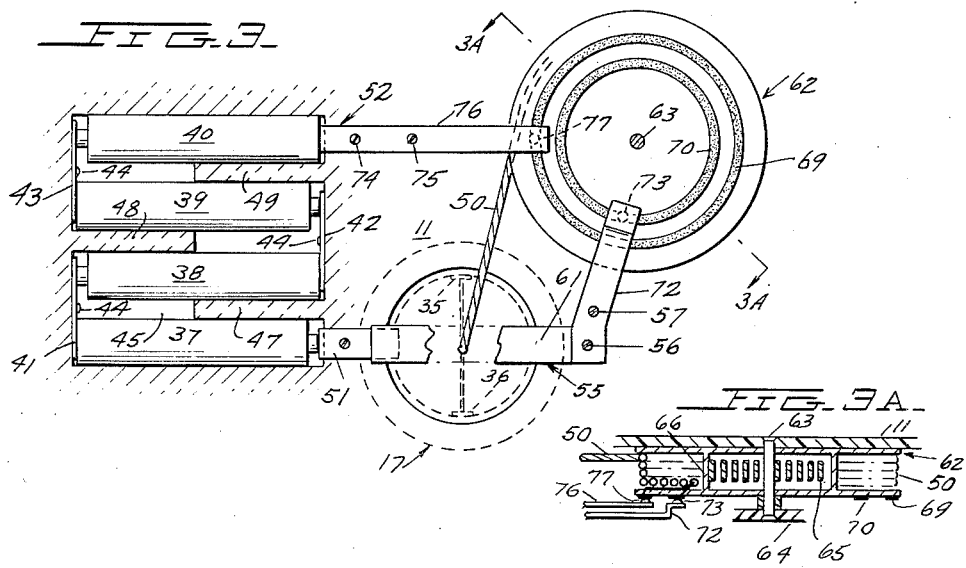
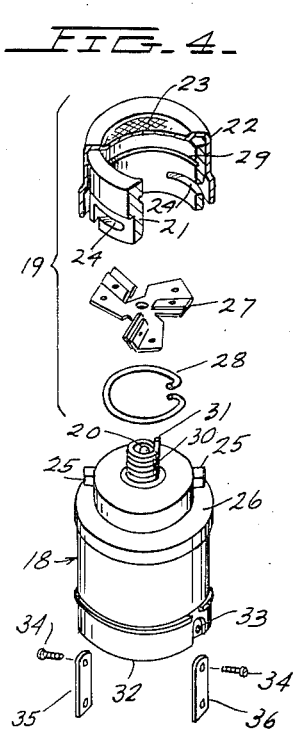
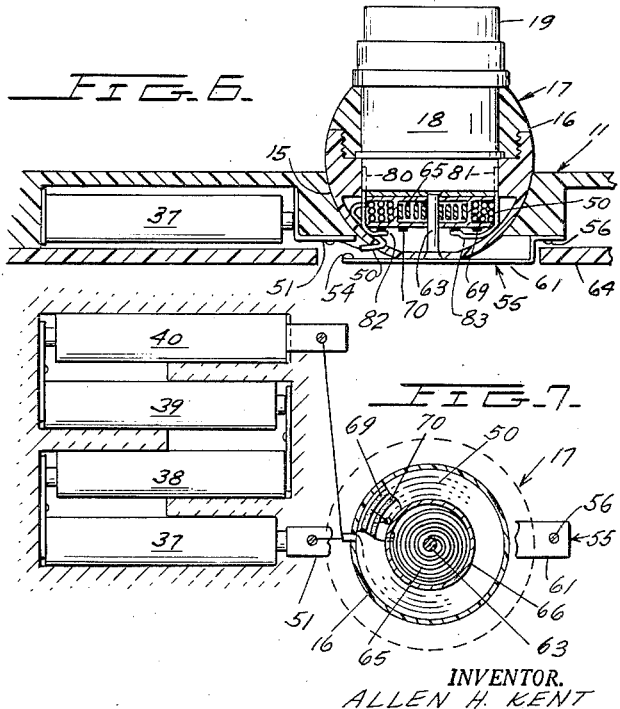
INVENTOR.
ALLEN H. KENT
BY Ostrolenk, Faber, Gerb & Soffen
ATTORNEYS

United States Patent Office 3,038,480
Patented June 12, 1962

3,038,480
SHAVER DESK SET
Allen H. Kent, 20 5th Ave., New York, N.Y.
Filed Sept. 28, 1959, Ser. No. 842,751
6 Claims. (Cl. 132—80)

The instant invention relates to ornamental desk sets and more particularly to a novel desk set which includes a battery powered motor operated shaver.

In the prior art most of the ornamental desk set constructions, in addition to providing utility receptacles for one or more pens, also include an ornamental object. However, this ornamental object serves no useful function.

The instant invention provides a desk set having an ornamental base with a number of utility receptacles. One of these receptacles is constructed to receive a motor operated electric shaver. The power for operation of the shaver is obtained from a plurality of batteries disposed within a suitable recess of the base. The shaver motor and battery means are interconnected by an extension cord which is operatively connected to a spring loaded reel in a manner such that as the shaver is moved toward its utility receptacle the reel will take up the excess length of the extension cord.

The circuit between the shaver motor and the battery means includes a pair of normally closed contacts. One of these contacts is disposed in the utility receptacle which receives the shaver. Upon insertion of the shaver into its utility receptacle, the last mentioned contact is engaged by the shaver and is thereby moved to a position where it is disengaged from its cooperating contact and in this manner the circuit between the shaver and battery means is interrupted. Thus, whenever the shaver is placed in its utility receptacle it will automatically be deenergized.

The electric shaver as part of a desk set is conveniently placed for operation by a person seated at the desk. Severe electric shocks and cords extending to a wall outlet are eliminated by utilizing a battery powered shaver. The ornamental base provides a convenient housing for the batteries thereby keeping to a minimum the weight to be hand held.

Accordingly, a primary object of the instant invention is to provide a novel construction for a desk set.

Another object is to provide a desk set having an ornamental portion which serves a useful function.

Still another object is to provide a desk set in which the base is provided with a battery means as well as a useful device energized by the battery means.

A further object is to provide a desk set including an electric motor powered shaver and means operable to deenergize the shaver motor whenever the shaver is placed in its receptacle in the desk set base.

These as well as other objects of the instant invention shall become readily apparent after reading the following description of the accompanying drawings in which:

FIGURE 3 is a fragmentary view of the desk set of FIGURE 1 looking inwardly from the bottom thereof with the bottom cover removed.

FIGURE 3A is a cross-section taken through line 3A—3A of FIGURE 3 looking in the direction of arrows 3A—3A.

FIGURE 4 is an exploded view of the motor and shaving head.

FIGURE 6 is a cross-section similar to FIGURE 2 illustrating another embodiment of this invention.

FIGURE 7 is a view similar to FIGURE 3 illustrating the embodiment of FIGURE 6.

Figure 1:
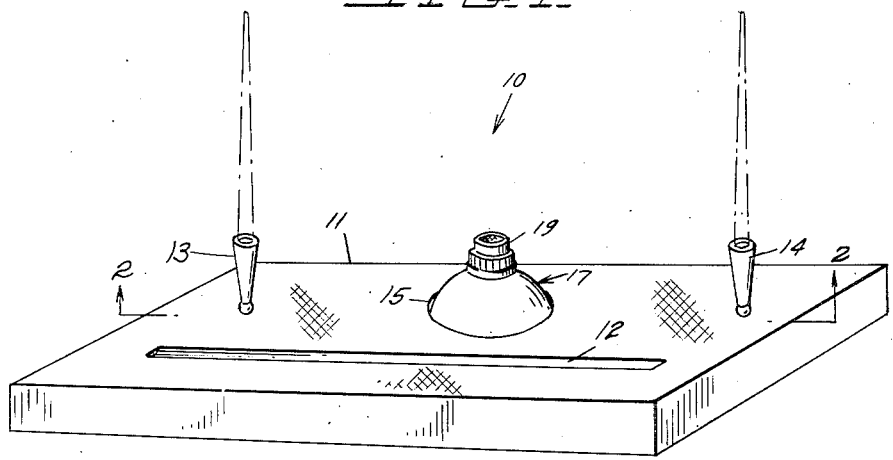
FIGURE 1 is a perspective of an ornamental desk set constructed in accordance with the instant invention.
Figure 2:
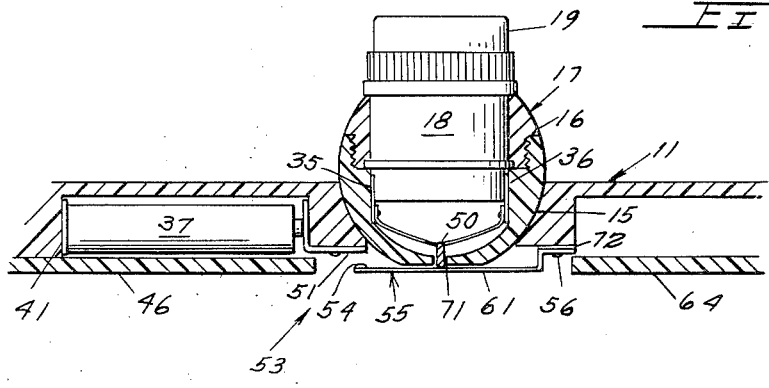
FIGURE 2 is a cross-section taken through line 2—2 of FIGURE 1 looking in the direction of arrows 2—2.
Figure 5:
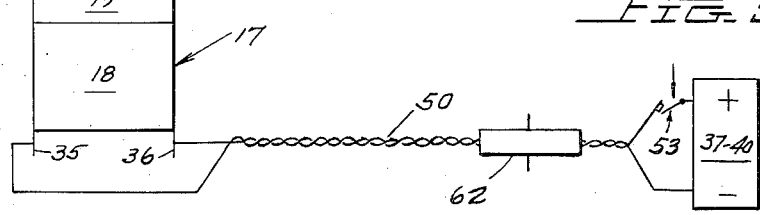
FIGURE 5 is a schematic of the desk set of FIGURE 1 illustrating the electrical interconnecting means thereof.

Now referring to the figures and more particularly to FIGURES 1–5, desk set 10 comprises an ornamental base 11 shaped as a generally oblong thick plate-like member. Base 11 may be of a single attractive color or may be provided with graining or other ornamental effect. A longitudinally extending groove 12 is formed in base 11 to provide a utility receptacle for pencils. Ornamental base 11 is also provided with a pair of spaced apart utility receptacles 13, 14 extending upwardly from the top surface thereof with each receptacle adapted to receive a conventional type fountain pen. Another utility receptacle 15 is also provided in base 11 between receptacles 13, 14.

Receptacle 15 is adapted to receive the generally spherically shaped housing 16 of electric motor powered shaver 17. Shaver 17 comprises miniature D.C. motor 18 and sharpener head 19 which is removably secured to the end of motor 18 from which output shaft 20 extends. Motor sharpener head combination 18, 19 is described in detail in my copending application Serial No. 755,698, filed August 18, 1958, and entitled "Electric Shaver."

Briefly, shaver head assembly 19 comprises a circular housing 21. Sleeve 22, having mesh-like whisker guide 23 affixed thereto, is secured to housing 22 with whisker guide 23 being positioned at one end of housing 21. Slot means 24 is provided near the other end of housing 21 and cooperates with bayonets 25 formed integrally with motor end bracket 26 to removably secure shaver head assembly 19 to motor 18.

Cutter assembly 27 is disposed within housing 21 and is maintained therein near the whisker guide end thereof by spring retainer 28 which is disposed within annular groove 29 of housing 21. Coil spring 30, secured at its lower end to motor shaft 20, is provided with an axially extending tip 31 at the other end thereof. When shaver head assembly 19 is mounted to motor 18 spring 30 biases the blade of cutter assembly 27 toward whisker guide 23 and spring extension 31 engages cutter assembly 27 for rotation thereof as motor shaft 20 rotates.

The other end bracket 32 of motor 18 is provided with threaded apertures 33 which receives screws 34. Brushes and springs therefor (not shown) are disposed within apertures 33 and are engaged by screws 34. Screws 34 also serve to retain motor terminals 35, 36 to end bracket 32.

Motor 18 is energized by a plurality of dry cells 37, 38, 39, 40 which are connected in electrical series by conductor straps 41–43. Ornamental base 11 is constructed of insulating material with conductor straps 41–43 being secured thereto by fasteners 44. Cells 37–40 are positioned within recess 45 of base 11 which is accessible for insertion and removal of cells 37–40 through a removably bottom cover 45. Base formations 47–49 extending into recess 45 provides means for operatively positioning cells 37–40.

Battery means 37–40 is electrically connected to sharpener motor 18 by a circuit means which comprises a twin conductor extension cord 50, one end of which is connected to motor terminals 35 and 36, and the other end of which is connected to terminal members 51, 52 at the positive and negative ends, respectively, of the series connected combination of cells 37–40. The normally closed switch 53 is positioned in series between one of the conductors of extension cord 50 and the positive terminal of battery means 37–40.

Switch 53 comprises movable contact 54 which is biased toward engagement with terminal member 51 by being mounted to one free end of resilient conducting member 55. Fasteners 56, 57 fixedly secure member 55 to ornamental base 11 at a point intermediate the ends thereof. When sharpener 17 is disposed within utility receptacle 15 housing 16 bears against portion 61 of member 55 causing movable contact 54 to separate from terminal member 51 so that the energizing circuit for motor 18 is interrupted.

Extension cord 50 is operatively connected at one end thereof to spring loaded take-up reel 62 which is pivotally mounted to shaft 63. Shaft 63 is mounted between the upper portion of ornamental base 11 and the lower cover portion 64 in a manner such that shaft 63 is maintained against rotation. Torsion spring 65 is wound about shaft 63 with the inner end of spring 65 being fixedly secured to reel 62 inside the ring-like portion 66 thereof.

Reel 62 further includes circular plates 67, 68 positioned on opposite sides of portion 66 and extending therebeyond to form an area within which extension cord 50 is received. Plates 67 and 68 are constructed of insulating material with the outer surface of plate 68 having a pair of slip rings 69, 70 secured thereto. The operative connection between cord 50 and reel 62 comprises fixed electrical connections between rings 69, 70 and individual ones of the extension cord conductors. The other end of extension cord 50 extends through aperture 71 in shaver housing 16. Conducting member 55 is formed with a second portion 72 which includes contact 73 at the free end thereof. Contact 73 is positioned so as to be biased into engagement with slip ring 70.

Conducting strap 52, forming the negative terminal of battery means combination 37–40, is secured intermediate the ends thereof to base 11 by fasteners 74, 75. A portion 76 of member 52 is provided with contact 77 at the free end thereof. Contact 77 is positioned so as to be biased into engagement with slip ring 69 through the resilient nature of the material forming member 52. Thus, for all rotative positions of reel 62 the conductors of cord 50 remain electrically connected to members 52 and 55.

As shaver 17 is withdrawn from receptacle 15 reel 62 is rotated. Since battery operated motor 18 requires very little operating current extension cord 50 is extremely light in weight so that a relatively weak spring 65 may be utilized. Because of this only an extremely small force is exerted by spring 65 upon shaver 17 even when cord 50 is fully extended. However, this force is adequate to take up extension cord 50 as shaver 17 is moved toward its receptacle 15.

The embodiment illustrated in FIGURES 6 and 7 is quite similar to the embodiments hereinbefore described. Because of this, like elements have been given the same reference numerals in both embodiments. The essential difference between the two embodiments is that take-up reel 62 is disposed within shaver housing 16 rather than being disposed in ornamental base 11. Because of this motor terminals 80, 81 are provided with inwardly turned portions 82, 83, respectively, which engage slip rings 69, 70, respectively.

Thus, I have provided a novel desk set which engages a battery operated electric shaver. The design of the shaver is such that its appearance adds to the ornamental features of the base. While my invention has been described in connection with an electric shaver the scope of this invention extends to desk sets having other electrical powered devices as a portion thereof.

Although this invention has been described with respect to its preferred embodiments it should be understood that many variations and modifications will now be obvious to those skilled in the art, and it is therefore preferred that the scope of the invention be limited not by the specific disclosure herein but only by the appended claims.

I claim:

1. In combination an ornamental base, battery means disposed within a compartment of said base, an electric motor powered shaver, circuit means electrically connecting said battery means to said shaver for energization thereof; said base having a first utility receptacle in a top surface thereof; said first utility receptacle being constructed to receive said shaver; said circuit means including a normally closed switch means disposed within said base; said switch means being operatively positioned in said first receptacle so as to be engaged by said shaver upon placement thereof in said receptacle; said switch means being opened through engagement thereof by said shaver and when opened being effective to deenergize said shaver.

2. In combination an ornamental base, battery means disposed within a compartment of said base, an electric motor powered shaver, circuit means electrically connecting said battery means to said shaver for energization thereof; said base having a first utility receptacle in a top surface thereof; said first utility receptacle being constructed to receive said shaver; said circuit means including an extension cord; a reel whereon substantially all of said cord is wound when said shaver is positioned in said first receptacle; biasing means for rotating said reel and thereby taking up said cord as said shaver is moved toward said first receptacle; said circuit means including a normally closed switch means disposed within said base; said switch means being operatively positioned in said first receptacle so as to be engaged by said shaver upon placement thereof in said receptacle; said switch means being opened through engagement thereof by said shaver and when opened being effective to deenergize said shaver.

3. In combination an ornamental base, battery means disposed within a compartment of said base, an electric motor powered shaver, circuit means electrically connecting said battery means to said shaver for energization thereof; said base having a first utility receptacle in a top surface thereof; said first utility receptacle being constructed to receive said shaver; said circuit means including an extension cord; a reel whereon substantially all of said cord is wound when said shaver is positioned in said first receptacle; biasing means for rotating said reel and thereby taking up said cord as said shaver is moved toward said first receptacle; said shaver including a motor and a housing wherein said motor is disposed; said reel and said biasing means therefor both being disposed within said housing; one end of said cord being secured to said reel and the other end of said cord extending into said first receptacle and being secured to means disposed within said base; said circuit means including a normally closed switch means disposed within said base; said switch means being operatively positioned in said first receptacle so as to be engaged by said shaver upon placement thereof in said receptacle; said switch means being opened through engagement thereof by said shaver and when opened being effective to deenergize said shaver.

4. In combination an ornamental slab-like base, battery means disposed within a compartment of said base, an electric motor powered shaver, circuit means electrically connecting said battery means to said shaver for energization thereof; said base having a plurality of utility receptacles at a top surface thereof; a first of said receptacles being constructed to receive said shaver with a portion thereof extending above said first surface; said circuit means including a normally closed switch means disposed within said base; said switch means being operatively positioned in said first receptacle so as to be engaged by said shaver upon placement thereof in said receptacle; said switch means being opened through engagement thereof by said shaver and when opened being effective to deenergize said shaver.

5. In combination an ornamental base, battery means disposed within a compartment of said base, an electric powered device, circuit means electrically connecting said battery means to said device for energization thereof; said base having a first utility receptacle in a top surface thereof; said first utility receptacle being constructed to receive said device; said circuit means including a normally closed switch means disposed within said base; said switch means being operatively positioned in said first receptacle so as to be engaged by said device upon placement thereof in said receptacle; said switch means being opened through engagement thereof by said device and when opened being effective to deenergize said device.

6. In combination an ornamental base, battery means disposed within a compartment of said base, an electric powered device, circuit means electrically connecting said battery means to said device for energization thereof; said base having a first utility receptacle in a top surface thereof; said first utility receptacle being constructed to receive said device; said circuit means including an extension cord; a reel whereon substantially all of said cord is wound when said device is positioned in said first receptacle; biasing means for rotating said reel and thereby taking up said cord as said device is moved toward said first receptacle; said circuit means including a normally closed switch means disposed within said base; said switch means being operatively positioned in said first receptacle so as to be engaged by said device upon placement thereof in said receptacle; said switch means being opened through engagement thereof by said device and when opened being effective to deenergize said device.

References Cited in the file of this patent

UNITED STATES PATENTS

| 1,223,305 | Allport | Apr. 17, 1917 |
| 2,458,721 | Nenno | Jan. 11, 1949 |

FOREIGN PATENTS

| 1,115,148 | France | Apr. 19, 1956 |